United States Patent
Skrippek et al.

(10) Patent No.: US 6,499,323 B2
(45) Date of Patent: Dec. 31, 2002

(54) FRONT-LOADING WASHING MACHINE

(75) Inventors: Jörg Skrippek, Priort (DE); Reinhard Heyder, Berlin (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 09/951,238

(22) Filed: Sep. 12, 2001

(65) Prior Publication Data

US 2002/0069679 A1 Jun. 13, 2002

Related U.S. Application Data

(63) Continuation of application No. PCT/EP00/02133, filed on Mar. 10, 2000.

(30) Foreign Application Priority Data

Mar. 12, 1999 (DE) .......................................... 199 11 139

(51) Int. Cl.[7] .............................................. D06F 37/30
(52) U.S. Cl. ..................................................... 68/140
(58) Field of Search .............................. 68/24, 140, 146

(56) References Cited

U.S. PATENT DOCUMENTS

| | | | |
|---|---|---|---|
| 2,625,031 A | * | 1/1953 | Kreitchman .............. 68/146 X |
| 2,687,861 A | | 8/1954 | Bruckman |
| 3,645,117 A | * | 2/1972 | Larsen ......................... 68/140 |
| 5,862,686 A | | 1/1999 | Skrippek |

FOREIGN PATENT DOCUMENTS

| | | |
|---|---|---|
| EP | 0 354 158 A2 | 2/1990 |
| EP | 0 413 915 A1 | 2/1991 |
| GB | 2 104 110 A | 3/1983 |
| LU | 37 211 | 5/1959 |

* cited by examiner

Primary Examiner—Philip Coe
(74) Attorney, Agent, or Firm—Laurence A. Greenberg; Werner H. Stemer; Gregory L. Maybeck

(57) ABSTRACT

A front-loading washing machine includes a tub having a rear wall with an inside surface, an outside surface, and a center, a bearing sleeve connected to the rear wall, a shaft disposed in the bearing sleeve and at the center of the rear wall, a motor connected to the outside surface of the rear wall at a distance from the center of the rear wall, a gear mechanism connected to the shaft and to the motor, and a laundry container mounted in a floating manner to the bearing sleeve through the shaft. The motor produces a torque and the gear mechanism transmits the torque produced by the motor to the shaft. The motor drives the laundry container. If the laundry container has a filling opening inclined upward, then the motor is disposed beneath the shaft in a region between the tub rear wall and a rear wall of the washing machine.

22 Claims, 3 Drawing Sheets

FRONT-LOADING WASHING MACHINE

CROSS-REFERENCE TO RELATED APPLICATION

This application is a continuation of copending International Application No. PCT/EP00/02133, filed Mar. 10, 2000, which designated the United States.

BACKGROUND OF THE INVENTION

Field of the Invention

The invention lies in the field of washing appliances. The invention relates to a front-loading washing machine with a laundry container mounted in a floating manner through a shaft within a bearing sleeve fixed to the rear wall of the tub, and driven by a motor disposed behind the rear wall of the tub.

German Published, Non-Prosecuted Patent Application DE 195 47 745 A1, corresponding to U.S. Pat. No. 5,894,746 to Skrippek and U.S. Pat. No. 5,862,686 to Skrippek, discloses such a drive device. In the drive device, the horizontally located shaft of the laundry container is connected to the rotor of the motor in a rotationally fixed manner at its outer end. Thus, the motor directly drives the shaft of the laundry container. Because the motor drives the laundry container directly, it has to apply a comparatively high torque to cause the container to move.

German Published, Non-Prosecuted Patent Application DE 39 27 426 A1 discloses a direct-current external-rotor motor for directly driving a laundry container in a laundry-treatment machine and of which the rotor drives the drive shaft of the laundry container through a gear mechanism, for example, a planetary gear mechanism. Because the gear mechanism is it provided between the motor and the rear wall of the washing machine, additional space is required, which is then not available for the laundry container.

Luxemburg Patent Application LU 37 211 discloses an electric drive motor fastened on an oscillating housing through a carrying arm and drives a belt pulley of a tub through transmission belts. British Patent No. GB 2 104 110 A discloses a drive motor fastened outside the periphery of a 354 158 A2, corresponding to U.S. Pat. No. 4,914,331 to Lewis, also disclose drive motors intended for driving laundry containers mounted in tubs and that are disposed behind the rear wall of the tub, but are not connected to the rear wall of the tub.

SUMMARY OF THE INVENTION

It is accordingly an object of the invention to provide a front-loading washing machine that overcomes the hereinafore-mentioned disadvantages of the heretofore-known devices of this general type and that improves a front-loading washing machine such that the motor is disposed in a space-saving manner.

With the foregoing and other objects in view, there is provided, in accordance with the invention, a front-loading washing machine including a tub having a rear wall with an inside surface, an outside surface, and a center, a bearing sleeve connected to the rear wall, a shaft disposed in the bearing sleeve and at the center of the rear wall, a motor connected to the outside surface of the rear wall at a distance from the center of the rear wall, the motor producing a torque, a gear mechanism connected to the shaft and to the motor, the gear mechanism transmitting the torque produced by the motor to the shaft, and a laundry container mounted in a floating manner to the bearing sleeve through the shaft, the laundry container driven by the motor.

The objectives are achieved according to the invention in that the motor is disposed on the rear wall itself outside the center of the rear wall, the center being formed by the shaft, and in that the torque produced by the motor can be transmitted to the shaft through a gear mechanism.

A particular advantage of the invention is that a motor that, in comparison with direct driving, has a lower torque drives the laundry container. The torque is reduced by a gear mechanism that, nevertheless, in contrast to a motor disposed concentrically to the drive shaft and an associated, likewise concentrically disposed gear mechanism, as is disclosed in German Published, Non-Prosecuted Patent Application DE 39 27 426 A1, results in a reduction in the installation space required for the drive.

Particularly advantageous in the case of the drive according to the invention is that the motor requires lower outlay in terms of materials than direct-drive motors. Moreover, for the drive according to the invention, the tolerances in the air gap can be better controlled than in the case of direct driving. Such control has a favorable effect on the machine efficiency and the motor noise.

In accordance with another feature of the invention, there is provided a carrier part connecting the motor to the outside surface of the rear wall, the carrier part being connected to the outside surface of the rear wall. Preferably, the carrier part directly connects the motor to the rear wall.

In accordance with a further feature of the invention, the bearing sleeve is fixed to the rear wall.

In accordance with an added feature of the invention, the carrier part has a carrier arm with a cup-like widened section housing the motor.

A further advantage of the invention is that the motor is disposed either on the rear wall itself or on the carrying part. The carrying part is formed, for example, by arms extending outward from the center formed by the laundry-container shaft, with the motor being disposed on one of the arms. The motor-bearing arm is preferably widened in the form of a circle in the same plane as the rear wall of the tub. As a result, in a plan view of the rear wall of the tub and of the carrying star, the motor extends in its entirety in the region of a carrying arm of the carrying part. The carrying part preferably has a U-shaped profile that is oriented away from the rear wall of the tub and gives it a higher level of rigidity. The U-shaped profile preferably also encloses the circular convexity in the motor-accommodating carrying arm. In another exemplary embodiment, the U-shaped profile for accommodating the motor is directed toward the rear wall of the tub.

In accordance with an additional feature of the invention, if the laundry container has a filling opening inclined upward, then the motor is disposed beneath the shaft in a region between the tub rear wall and a rear wall of the washing machine.

The motor according to the invention is particularly advantageously used when the laundry container and the tub accommodating it are disposed in the washing machine with a slight inclination, for example, approximately 10° or 15°, in relation to the horizontal, with the front side of the tub, which is provided with the filling opening, being located at a higher level than the rear wall. In such a case, the motor is disposed beneath the laundry-container shaft. As a result, the top edge of the rear wall of the tub is located in the vicinity of the rear wall of the washing-machine housing and, beneath the laundry-container shaft, which is located in the center of the rear wall of the tub, there is sufficient space between the rear wall of the tub and the rear wall of the housing to accommodate the motor.

In accordance with yet another feature of the invention, the carrier part has a carrier side directed away from the rear wall and the motor is disposed on the carrier side.

In accordance with yet a further feature of the invention, the motor is disposed on the carrier part in a region between the carrier part and the rear wall.

In accordance with yet an added feature of the invention, the motor has a motor shaft, a pulley is connected to the motor shaft, a belt is connected to the pulley and to the shaft, and the motor drives the shaft through the belt and the pulley.

In accordance with yet an additional feature of the invention, the shaft has a shaft pulley and the belt is disposed around the shaft pulley.

In accordance with again another feature of the invention, the shaft has a bell-like flange and the belt is disposed around the flange.

Possible gear mechanisms include a toothed belt or a V-belt in conjunction with corresponding belt pulleys or a toothed gear mechanism, in particular, with helically toothed gearwheels. It is also possible to use a chain to transmit the movement from a pinion provided on the motor shaft to a chain wheel provided on the laundry-container shaft.

In accordance with again a further feature of the invention, the belt is one of a V-belt, a toothed belt, and V-ribbed belt.

In accordance with again an added feature of the invention, the gear mechanism has gearwheels and the gearwheels drive the shaft.

In accordance with again an additional feature of the invention, the motor is an external-rotor motor. The stator cores and the magnetic poles of the rotor are disposed either axially or radially in relation to one another.

In accordance with still another feature of the invention, the motor has stator cores and the carrier part has a flange forming a bearing sleeve of the motor shaft and bearing the stator cores.

In accordance with still a further feature of the invention, the motor has magnetic poles and the stator cores and the magnetic poles of the motor are located opposite one another in an axial or direction with respect to the motor shaft.

In accordance with still an added feature of the invention, the motor has a rotor and the rear wall or carrier part has an annular-shaped side wall surrounding the rotor.

In accordance with still an additional feature of the invention, the motor has a rotor shaped as a bell-like flange.

In accordance with a concomitant feature of the invention, the motor is an electronically commutated direct-current motor, an asynchronous motor controlled by a frequency converter, or a reluctance motor.

Other features that are considered as characteristic for the invention are set forth in the appended claims.

Although the invention is illustrated and described herein as embodied in a front-loading washing machine, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
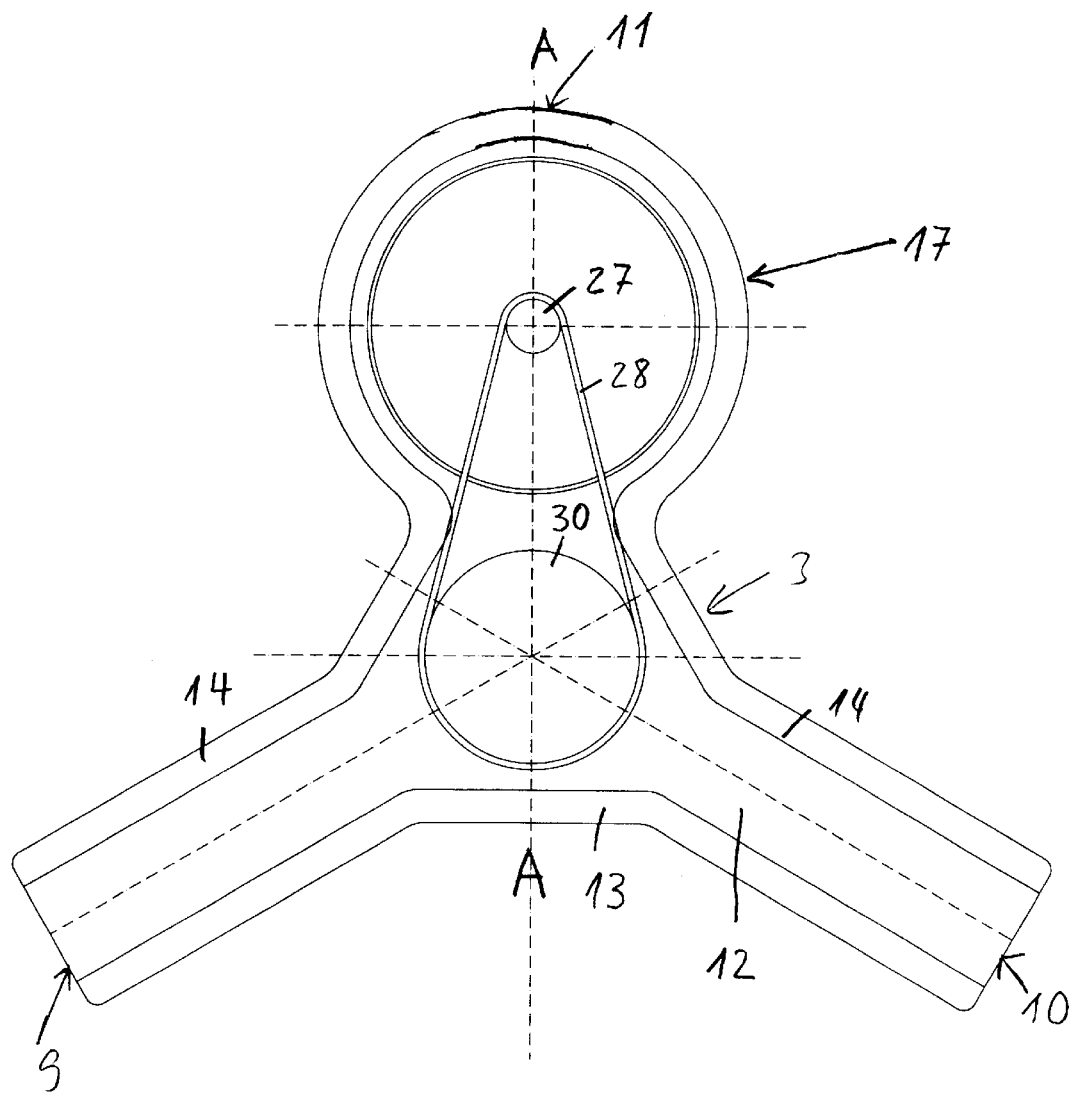
FIG. 1 is a diagrammatic, plan view of a drive device and of a carrying part provided on a rear wall of a tub according to the invention.

In all the figures of the drawing, sub-features and integral parts that correspond to one another bear the same reference symbol in each case.

Figure 2:
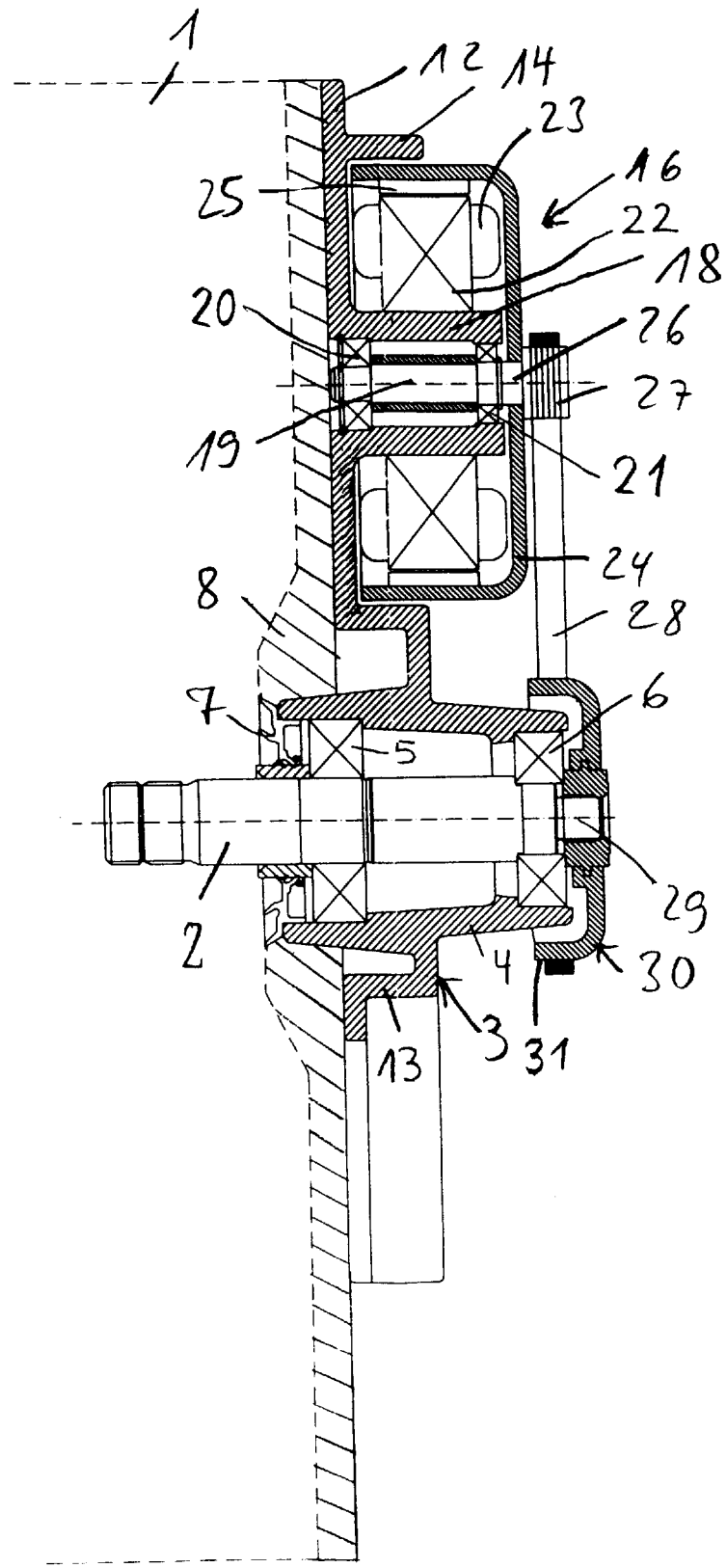
FIG. 2 is a fragmentary, cross-sectional view of the drive device and the carrying part according to FIG. 1 along the section line A—A.
Figure 3:
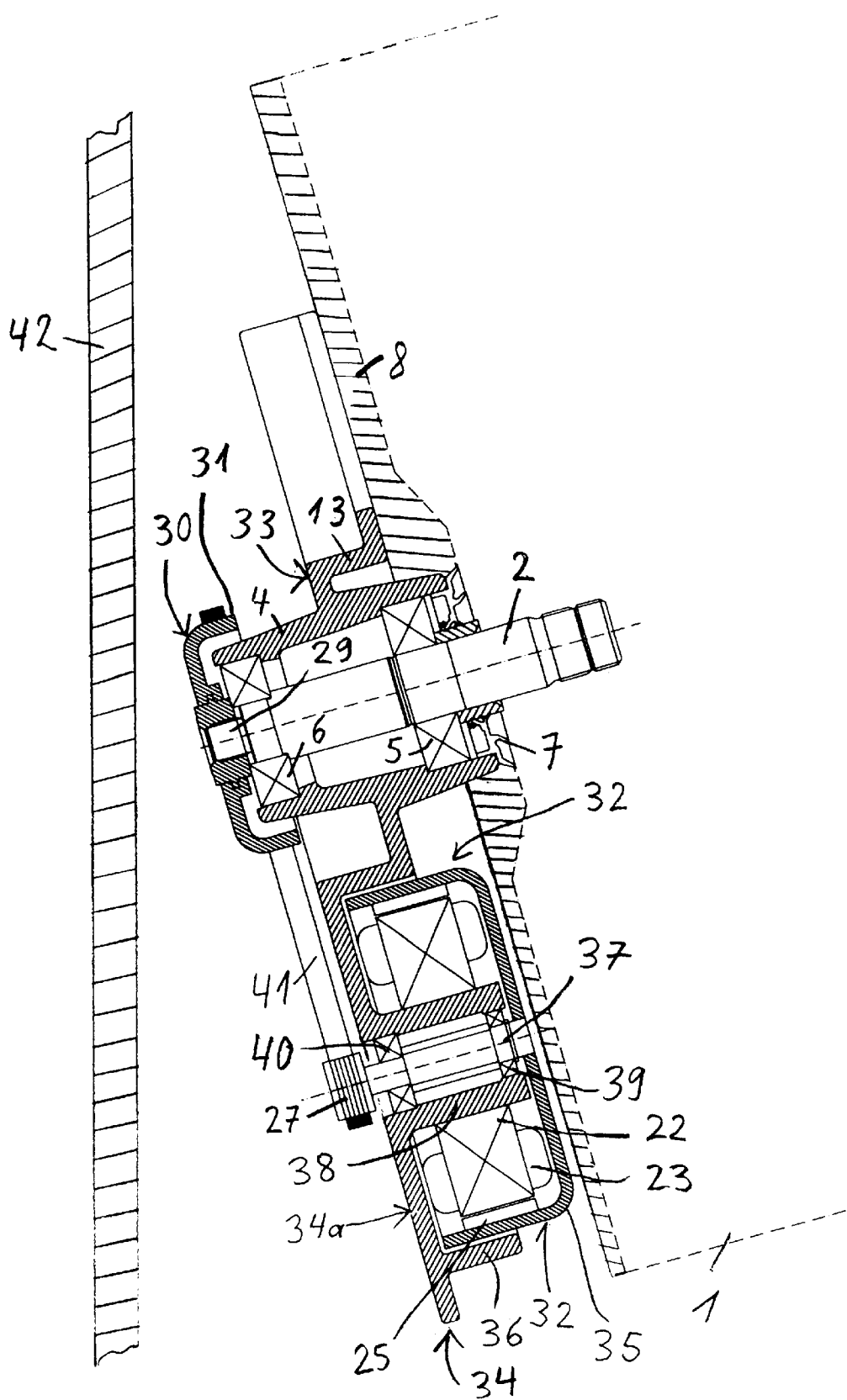
FIG. 3 is a fragmentary, cross-sectional view of a second embodiment of the drive device according to the invention for an inclined tub, the rotor bell of the drive device being fastened on the carrying part on the side that is directed toward the rear wall of the tub.

Referring now to the figures of the drawings in detail and first, particularly to FIGS. 2 and 3 thereof, there is shown a tub 1 of a washing machine has a non-illustrated laundry container that rotates in it and is mounted in a floating manner in the tub 1 through a horizontal shaft 2 (FIG. 2) or an inclined shaft 2 (FIG. 3). It is possible to realize inclinations of, for example, 10° or 15° in relation to the horizontal; which goes without saying that it is also possible to select larger inclinations according to the invention. The shaft 2 of the laundry container is mounted in a carrying part 3. The carrying part 3 has a bearing bushing 4 that accommodates bearings 5 and 6, for example ball bearings, in which the shaft 2 is mounted.

To avoid the washing liquid from escaping from the tub 1, an annular seal 7 is provided. The seal encloses the shaft 2 in the region of the rear wall 8 of the tub 1.

The carrying part 3 is fixed to the rear wall 8, for example, through screw-connections. The carrying part 3 has arms 9, 10, 11 extending in a star form from the center of the rear wall 8. See FIG. 1. For reinforcement purposes, the arms 9 to 11 each have a U-shaped profile and, alongside a wall 12 resting on the rear wall 8, have side walls 13, 14 oriented away from the rear wall 8 perpendicularly thereto.

The arm 11 has a cup-like widened section 17 for accommodating a motor 16. In the center of the widened section 17, the carrying part 3 has a flange 18 that is oriented away from the rear wall 8 and is intended for accommodating the motor shaft 19, which is mounted in the flange 18 through bearings 20, 21. Stator cores 22, which bear exciter windings 23, are fastened on the flange 18. The stator cores 22 are located radially opposite magnetic poles 25 fastened on the inner wall of a bell-like flange 24, which forms the rotor of the motor 16. Instead of the radial configuration of the stator cores 22 and of the poles 25, it is also possible for the stator cores to be disposed on that wall of the carrying part 3 that runs along the rear wall 8 and for the magnetic poles 25 to be fastened on the base of the flange 24 essentially in the same plane as the rear wall 8. The flange 24 is fastened on a shaft journal 26, which forms the extension of the motor shaft 19. The shaft journal 26 likewise serves for accommodating a pulley 27 for a V-ribbed belt 28. The V-ribbed belt 28 transmits the rotary movement of the motor 16 to a bell-like flange 30 that is fastened on a journal 29 of the shaft 2 and around the cylindrical outer wall 31 of which the V-ribbed belt 28 runs. It goes without saying that it is also possible to provide a V-belt pulley instead of the outer wall 31.

Because the side wall 14 covers over the flange 24 at least partially in the upward and lateral directions, particles of dirt are prevented in an effective manner from penetrating into the region between the stator cores 22 and the poles 25.

The U-shaped profile formed by the wall 12 and the side walls 13 to 15 gives the arms 9 to 11 a high level of stability.

Instead of the embodiment illustrated in FIGS. 1 and 2, a motor 32 is disposed, in the case of the drive device illustrated in FIG. 3, on that side of a carrying part 33 that is directed toward the rear wall 8 of the tub 1. The carrying part 33, like the carrying part 3, is, for example, likewise of star-shaped configuration but in the region of its carrying arm 34, which has a cup-like widened section 34a, is constructed differently to the carrying part 3. The carrying arm 34 includes a plate 34a and a wall 36 that is positioned perpendicularly on the plate 34a, is disposed essentially in the form of a circle around the bell-like flange 35 of the motor 32 and is oriented in the direction of the rear wall 8. Otherwise, the motor 32 is constructed in the same way as the motor 16, as is indicated by the use of the same designations. In the second embodiment too, the stator cores and the poles may be disposed in the axial direction. Through a motor shaft 37, which is mounted in a bearing-sleeve-forming flange 38 of the carrying arm 34 through bearings 39, 40, the motor 32 drives a V-ribbed belt 41 in the same way as the motor 16 drives the V-ribbed belt 28.

Positioning the motor 16, 32 eccentrically provides a drive device with an indirect drive for the shaft 2, with the result that the motor 16, 32 is only required to apply a torque that is lower than that applied by a motor driving the shaft 2 directly, as is disclosed from U.S. Pat. Nos. 5,894,746 and 5,862,686 to Skrippek. By virtue of the gear mechanism, the rotational speed of the motor shaft 19, 37 is stepped down at a ratio of, for example, 3:1 or 4:1. The step-down makes it possible to construct a motor with lower outlay in terms of materials than is the case with a direct drive.

Instead of the external-rotor motors illustrated in FIGS. 2 and 3, it is also possible to use internal-rotor motors, these, with the same overall size, i.e., the air gaps being disposed at the same location, having a smaller rotor, and, thus, also being able to apply a lower torque, than the external-rotor motor. Because the motor 16, 32, due to its compact construction, is disposed in the region behind the rear wall 8 of the tub 1, the installation space beneath the tub 1 is available for other configurations of the washing machine.

It is possible to provide, as motor 16, 32, an asynchronous motor, a direct-current motor, or a reluctance motor. The asynchronous motor is controlled through a frequency converter, and the direct-current motor is a brush-less, electronically-commutated motor controlled through a power converter. The converter drive makes it possible for the motors 16, 32 to be activated and braked in a positionally precise manner. With a step-down ratio of 3:1, the locational resolution of the braking position of the motor 16, 32 of ±3° gives a laundry-container position resolution of ±1°. Such characteristics mean that the locational position resolution is further increased by the step-down gear mechanism. Precise locational resolution can be achieved, in particular, with the use of a toothed gear mechanism with helically toothed gearwheels, in particular, and with the use of a toothed belt instead of a straightforward V-belt or of the V-ribbed belt.

In comparison with a conventional indirect drive, the V-ribbed belt 28, 41 or a corresponding V-belt or toothed belt has a greater wraparound angle on the outer wall 31 of the flange 30 and may, thus, have a narrower configuration than in the case of a conventional drive.

The motor 16 is either, as is illustrated in FIG. 2, disposed on a separate carrying part 3 or is fastened directly on the rear wall 8 of the tub 1 of the washing machine. It is also possible for the stator of the motor 32, illustrated in FIG. 3, to be formed by a flange of the rear wall 8.

A particularly advantageous construction of the washing machine is achieved when the machine, as is illustrated in FIG. 3, has a laundry container with the filling opening inclined upward in relation to the horizontal as well as a likewise inclined shaft 2. As a result, the rear wall 8 is likewise correspondingly inclined in relation to the vertical and the motor 16, 32 is disposed beneath the shaft 2 in the region between the rear wall 8 and the rear wall 42 of the washing machine. Such a configuration provides extremely space-saving accommodation for the motor 16, 32.

A drive device for a front-loading washing machine with a laundry container that is mounted in a floating manner, through an essentially horizontal shaft 2, within a bearing sleeve 4 that is fixed to the rear wall 8 of the tub 1 is driven by a motor 16, 32, which is likewise disposed behind the rear side 8 of the tub 1. In such a case, the motor 16, 32 is disposed outside the center of the rear wall 8. The center is formed by the shaft 2, albeit behind the same. It transmits its torque to the shaft 2 through a gear mechanism that is formed, for example, by a pulley 27 and a V-ribbed belt 28, 41.

We claim:

1. A front-loading washing machine, comprising:

a tub having a rear wall with an inside surface, an outside surface, and a center;

a bearing sleeve connected to said rear wall;

a shaft disposed in said bearing sleeve and at said center of said rear wall;

a motor connected to said outside surface of said rear wall at a distance from said center of said rear wall, said motor producing a torque;

a drive mechanism connected to said shaft and to said motor, said drive mechanism transmitting a torque produced by said motor to said shaft; and a laundry container mounted in a floating manner to said bearing sleeve through said shaft, said laundry container driven by said motor.

2. The washing machine according to claim 1, including a carrier part connecting said motor to said outside surface of said rear wall, said carrier part being connected to said outside surface of said rear wall.

3. The washing machine according to claim 2, wherein said carrier part has a carrier arm with a cup-like widened section housing said motor.

4. The washing machine according to claim 2, wherein:

said carrier part has a carrier side directed away from said rear wall; and said motor is disposed on said carrier side.

5. The washing machine according to claim 2, wherein said motor is disposed on said carrier part in a region between said carrier part and said rear wall.

6. The washing machine according to claim 2, wherein:

said motor has a rotor; and said carrier part has an annular-shaped side wall surrounding said rotor.

7. The washing machine according to claim 1, including a carrier part directly connecting said motor to said outside surface of said rear wall, said carrier part being connected to said outside surface of said rear wall.

8. The washing machine according to claim 1, wherein said bearing sleeve is fixed to said rear wall.

9. The washing machine according to claim 1, wherein:
said motor has a motor shaft;
a pulley is connected to said motor shaft;
a belt is connected to said pulley and to said shaft; and
said motor drives said shaft through said belt and said pulley.

10. The washing machine according to claims 9, wherein said shaft has a shaft pulley and said belt is disposed around said shaft pulley.

11. The washing machine according to claim 9, wherein said shaft has a bell-like flange and said belt is disposed around said flange.

12. The washing machine according to claim 9, wherein said belt is one of a V-belt, a toothed belt, and V-ribbed belt.

13. The washing machine according to claim 9, wherein:
said motor has stator cores; and
said carrier part has a flange forming a bearing sleeve of said motor shaft and bearing said stator cores.

14. The washing machine according to claim 13, wherein:
said motor has magnetic poles; and
said stator cores and said magnetic poles of said motor are located opposite one another in an axial direction with respect to said motor shaft.

15. The washing machine according to claim 13, wherein:
said motor has magnetic poles; and
said stator cores and said magnetic poles of said motor are located opposite one another in a radial direction with respect to said motor shaft.

16. The washing machine according to claim 1, wherein said motor is an external-rotor motor.

17. The washing machine according to claim 1, wherein:
said motor has a rotor; and
said rear wall has an annular-shaped side wall surrounding said rotor.

18. The washing machine according to claim 1, wherein said motor has a rotor shaped as a bell-like flange.

19. The washing machine according to claim 1, wherein said motor is an electronically commutated direct-current motor.

20. The washing machine according to claim 1, wherein:
said motor is an asynchronous motor; and
a frequency converter controls said asynchronous motor.

21. The washing machine according to claim 1, wherein said motor is a reluctance motor.

22. A front-loading washing machine having a rear wall and a bottom, comprising:
a tub having a tub rear wall with an inside surface, an outside surface, and a center;
a bearing sleeve connected to said tub rear wall;
a shaft disposed in said bearing sleeve and at said center of said tub rear wall;
a motor connected to said outside surface at a distance from said center of said tub rear wall, said motor producing a torque and being disposed beneath said shaft in a region between said tub rear wall and a rear wall of the washing machine;
a drive mechanism connected to said shaft and to said motor, said drive mechanism transmitting a torque produced by said motor to said shaft; and
a laundry container having a filling opening inclined upward with respect to a bottom of the laundry machine, said laundry container mounted in a floating manner to said bearing sleeve through said shaft and driven by said motor.

* * * * *